(12) United States Patent
Yamashita et al.

(10) Patent No.: US 6,255,020 B1
(45) Date of Patent: *Jul. 3, 2001

(54) LITHIUM SECONDARY BATTERY

(75) Inventors: Yasuhisa Yamashita; Koji Hattori, both of Shiga-ken; Yukio Sakabe, Kyoto, all of (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/914,412

(22) Filed: Aug. 19, 1997

(30) Foreign Application Priority Data

Aug. 29, 1996 (JP) .................................................. 8-248674
Aug. 29, 1996 (JP) .................................................. 8-248675

(51) Int. Cl.$^7$ ..................................................... H01M 4/24
(52) U.S. Cl. ...................................... 429/231.95; 429/223
(58) Field of Search ........................... 429/231.3, 231.95, 429/223

(56) References Cited

U.S. PATENT DOCUMENTS 5,702,845 * 12/1997 Kawakami et al. ................. 429/224
5,705,296 * 1/1998 Kamuchi et al. .................... 429/218

FOREIGN PATENT DOCUMENTS

| 0582448 | 2/1994 | (EP) . |
| 0709906 | 5/1996 | (EP) . |
| 7006764 | 1/1995 | (JP) . |
| 8321300 | 12/1996 | (JP) . |

* cited by examiner

*Primary Examiner*—Stephen Kalafut
*Assistant Examiner*—M. Wills
(74) *Attorney, Agent, or Firm*—Ostrolenk, Faber, Gerb & Soffen, LLP

(57) ABSTRACT

The invention provides a lithium secondary battery comprising a cathode having a lithium cobalt complex oxide or a lithium nickel complex oxide as a cathode active material, which is characterized in that said lithium cobalt complex oxide is in the form of hollow, spherical sinters of particles, and said sinters have a mean particle diameter of from about 1 to 5 micrometers and a specific surface area of from about 2 to 10 m$^2$/g. The lithium secondary battery has high capacity and excellent charge-discharge cycle characteristics.

13 Claims, 3 Drawing Sheets

LITHIUM SECONDARY BATTERY

BACKGROUND OF THE INVENTION

1. Field of the Invention

The present invention relates to a lithium secondary battery comprising a cathode having a lithium cobalt complex oxide or a lithium nickel complex oxide as a cathode active material.

2. Related Art of the Invention

Portable and cordless electronic appliances are becoming increasingly popular. As the power source for such electronic appliances, there is a great demand for small-sized and lightweight secondary batteries having a high energy-density. Lithium secondary batteries comprising a non-aqueous electrolytic solution have been put to practical use to meet such demands.

In general, a lithium secondary battery consists essentially of a cathode having a lithium-containing compound as the active material, an anode having a material capable of absorbing and desorbing lithium, such as a carbon material, or lithium metal as the active material, a separator, and a non-aqueous electrolytic solution. Of such elements constituting the battery, the lithium-containing compound for the cathode active material may include, for example, lithium cobalt complex oxides ($LiCoO_2$, etc.), lithium nickel complex oxides ($LiNiO_2$, etc.), and lithium manganese complex oxides ($LiMn_2O_4$, etc.). Of these, $LiCoO_2$ and $LiNiO_2$ are now in practical use. The $LiNiO_2$ produces a larger depth of charge and discharge to give a larger discharge capacity compared with $LiCoO_2$ and the cost of the source of $LiNiO_2$ is lower than that of $LiCoO_2$.

In conventional lithium secondary batteries comprising the lithium cobalt complex oxide ($LiCoO_2$) or the lithium nickel complex oxide ($LiNiO_2$) as the cathode active material, particles of $LiCoO_2$ or $LiNiO_2$ having a large particle size and a small specific surface area are used in order to increase the density of the cathode active material to thereby improve the utilization of the batteries, or in order to prevent the decomposition of the electrolytic solution in the batteries. However, the conventional batteries comprising such large particles of $LiCoO_2$ or $LiNiO_2$ are problematic in that they require shallow charge and discharge. This is because when the batteries repeatedly undergo deep charge and discharge, their cycle life is much shortened. In a shallow charge and discharge, however, Li ions diffuse in the cathode active material insufficiently, resulting in that the energy density per the unit volume of the batteries being lowered.

On the other hand, lithium secondary batteries comprising particles of $LiCoO_2$ or $LiNiO_2$ having a small particle size and a large specific surface area are also problematic in that the electrolytic solution that is in contact with the small particles of $LiCoO_2$ or $LiNiO_2$ is decomposed whereby the charge-discharge cycle characteristics and also the storage characteristics of the batteries are worsened. In addition, since such small particles of $LiCoO_2$ or $LiNiO_2$ are difficult to shape, there is still another problem with these in that $LiCoO_2$ or $LiNiO_2$ of that type requires a large amount of binder when shaped into cathodes, thereby lowering the density of the cathode active material and lowering the energy density per the unit volume of the batteries.

Given the situation, the object of the present invention is to solve the above-mentioned problems and to provide a lithium secondary battery having high capacity and having excellent charge-discharge cycle characteristics.

SUMMARY OF THE INVENTION

The present invention provides a lithium secondary battery of above mentioned kind, which is characterized in that said lithium cobalt complex oxide is in the form of hollow, spherical sinters of particles, and said sinters have a mean particle diameter of from about 1 to 5 micrometers and a specific surface area of from about 2 to 10 $m^2/g$.

In the above lithium secondary battery, said lithium cobalt complex oxide may be $LiCoO_2$. The Co may or may not be partially substituted by at least one member of the group consisting of Cr, Mn, Fe, Ni, Mg and Al. The sinters may preferably have a mean particle diameter of from about 2.8 to 4.3 micrometers and a specific surface area of from about 2.0 to 3.9 $m^2/g$.

In the above lithium secondary battery, said lithium nickel complex oxide may be $LiNiO_2$. The Ni may or may not be partially substituted by at least one member of the group consisting of Cr, Mn, Fe, Co, Mg and Al. The sinters may preferably have a mean particle diameter of from about 3.0 to 4.6 micrometers and a specific surface area of from about 2.1 to 4.1 $m^2/g$.

The above lithium secondary battery may further comprise an anode having a material capable of absorbing and desorbing lithium ions or lithium metal or a lithium alloy as the active material, and a separator containing a non-aqueous electrolytic solution or a solid electrolyte.

In the lithium secondary battery of the present invention using such spherical hollow particles of a lithium cobalt complex oxide or a lithium nickel complex oxide of which the particle size and the specific area are controlled as the cathode active material, the non-aqueous electrolytic solution can well penetrate into the spherical hollow particles, while being prevented from being decomposed, and the contact area between the non-aqueous electrolytic solution and the particles is enlarged. Therefore, the degree of utilization of the cathode active material in the battery of the invention is improved. In addition, since the cathode active material comprises relatively large secondary particles formed through sintering of primary materials, it can be well shaped while having a suitably large specific surface area. Even if the amount of the binder added thereto is reduced, the material can still be shaped into a cathode having an increased energy density per the unit volume.

The lithium secondary battery of the invention may comprise, as an anode active material, a material capable of absorbing and desorbing lithium such as a carbon material or lithium metal or a lithium alloy. The non-aqueous electrolytic solution in the battery may be a solution prepared by dissolving an electrolyte of a lithium salt, such as $LiPF_6$, $LiClO_4$, $LiBF_4$ or $LiAsF_6$, in a mixed solvent comprising propylene carbonate or ethylene carbonate, and diethoxyethane or dimethoxyethane. As a separator for the battery, employable is a porous polypropylene film or non-woven fabric. In place of the separator comprising such a non-aqueous electrolytic solution, also employable is a solid electrolyte.

Now, preferred embodiments of the invention are described hereinunder with reference to the following Examples.

PREFERRED EMBODIMENTS OF THE INVENTION

EXAMPLE 1
$LiCoO_2$ Used as the Lithium Cobalt Complex Oxide

Lithium nitrate and cobalt nitrate were prepared as starting materials. Next, the lithium nitrate and cobalt nitrate were accurately weighed in a molar ratio, Li/Co, of 1/1, and put into a container, to which was added 1000 ml of a 1/1 by volume mixture of water/alcohol, and these were stirred to give a solution.

The resulting solution was atomized into a vertical thermal-decomposition furnace conditioned at a predetermined temperature falling between 600° C. and 800° C., at a rate of 1200 ml/hour through a nozzle, and pyrolyzed therein to obtain a powdery complex oxide. Next, the resulting complex oxide was put into an alumina sagger and annealed therein at a predetermined temperature falling between 300° C. and 900° C. for 2 hours. In that manner were obtained complex oxide samples Nos. 1 to 5 of $LiCoO_2$, as shown in Table 1. In Table 1, the samples marked with asterisk (*) are outside the scope of the present invention, while the others are within the scope of the invention.

Apart from these, a comparative sample, No. 6 in Table 1, of $LiCoO_2$ was obtained according to a conventional solid-phase method. For this, lithium carbonate and cobalt oxide were prepared as starting materials. Next, the lithium carbonate and cobalt oxide were accurately weighed in a molar ratio, Li/Co, of 1/1, then ground and mixed in a ball mill, and thereafter calcined at 850° C. for 48 hours to obtain a complex oxide. In addition, another comparative sample, No. 7 in Table 1, $LiCoO_2$ was prepared by again milling the comparative sample No. 6 in a ball mill.

Pictures of the powdery complex oxides obtained hereinabove were taken through scanning electron microscope (SEM) photography, in which the morphology of the particles was observed and the particle size thereof was measured. In addition, the specific surface area of each complex oxide was obtained according to the nitrogen adsorption method. Further, the complex oxides were analyzed through X-ray diffractometry (XRD). The data obtained are shown in Table 1. In Table 1, LC indicates that the diffraction pattern of the sample corresponded to that of a layer-structured rock salt-type $LiCoO_2$ while giving no peaks for impurities.

Figure 1:
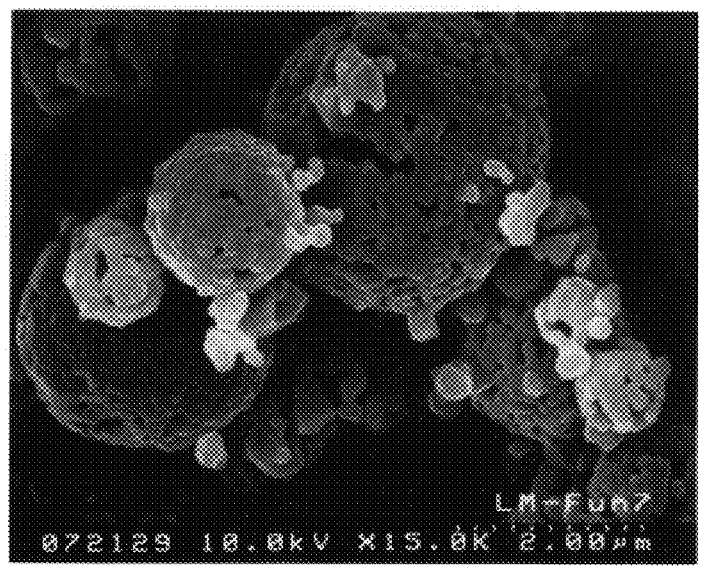
FIG. 1 is an SEM photograph of the cathode active material comprising lithium cobalt complex oxide to be used in the lithium secondary battery of the present invention.

The SEM photograph of sample No. 1 is shown in FIG. 1. This shows that the complex oxide of sample No. 1 comprised hollow, spherical secondary particles formed through sintering of fine primary particles. The surface of each hollow, spherical secondary particle had many pores running into the inside thereof.

The powdery complex oxides obtained hereinabove were shaped into cathodes, whereupon their shapability was evaluated. Briefly, 100 parts by weight of complex oxide as the cathode active material, 5 parts by weight of acetylene black as a conductor, and from 5 to 20 parts by weight of polyethylene tetrafluoride as a binder were kneaded and shaped into sheets. The shapability of the mixtures into sheets is shown in Table 1. In Table 1, "O" means that the mixture was well shaped into sheets; "P" means that the mixture was nearly shaped into sheets; and "X" means that the mixture could not be shaped into sheets.

TABLE 1

| Sample No. | Atomizing Temperature (° C.) | Annealing Temperature (° C.) | Shape of Particles | Mean particle Size (micrometer) | Specific Surface Area ($m^2/g$) | XRD Analysis | Shapability Amount of Binder Added (parts by weight) | | |
|---|---|---|---|---|---|---|---|---|---|
| | | | | | | | 5 | 10 | 20 |
| 1 | 800 | 800 | hollow spheres | 2.8 | 3.9 | LC | O | O | O |
| 2 | 800 | 600 | hollow spheres | 2.2 | 9.2 | LC | O | O | O |
| 3 | 600 | 800 | hollow spheres | 4.3 | 2.0 | LC | O | O | O |
| *4 | 800 | 300 | hollow spheres | 1.2 | 26.1 | LC | P | O | O |
| *5 | 800 | 900 | hollow spheres | 7.2 | 0.6 | LC | O | O | O |
| *6 | 850 (solid phase reaction method) | | bulky mass | 8.5 | 0.4 | LC | O | O | O |
| *7 | 850 (solid phase reaction method) | | bulky mass | 1.1 | 7.6 | LC | X | P | O |

Next, using the complex oxides obtained hereinabove as the cathode active material, produced were secondary batteries.

Precisely, 100 parts by weight of the complex oxide, 5 parts by weight of acetylene black (a conductor), and 5 parts by weight of polyethylene tetrafluoride (a binder) were kneaded and shaped into sheets. For sample No. 7, 10 parts by weight of the binder was used since its shapability was poor, as shown in Table 1. Each sheet was attached under pressure to a 17 mm diameter disc of SUS mesh to prepare a cathode.

Figure 2:
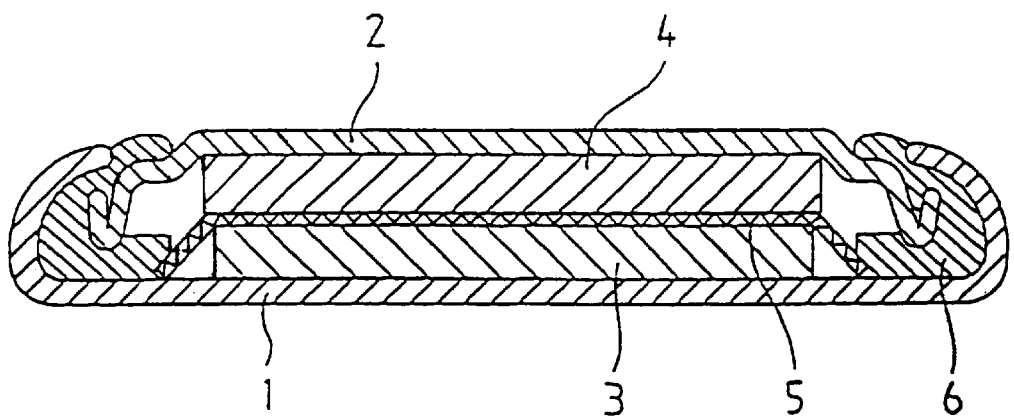
FIG. 2 is a cross-sectional view showing one embodiment of the lithium secondary battery of the invention.

Next, as shown in FIG. 2, the cathode 3 was combined with an anode 4 of lithium metal (diameter: 17 mm, thickness: 0.2 mm) with a polypropylene separator 5 therebetween, with the SUS mesh of the cathode 3 facing outward, and cased in a cathode can 1 made of stainless steel with the cathode 3 facing downward. Then, an electrolytic solution was impregnated into the separator 5. As the electrolytic solution, used herein was a solution as prepared by dissolving $LiPF_6$ in a 1/1 (by volume) mixed solvent of propylene carbonate and 1,1-dimethoxyethane, to a concentration of 1 mol/liter. Next, the opening of the cathode can 1 was sealed with an anode plate 2 made of stainless steel with an insulating packing 6 therebetween. Thus was obtained a lithium secondary battery.

Figure 3:
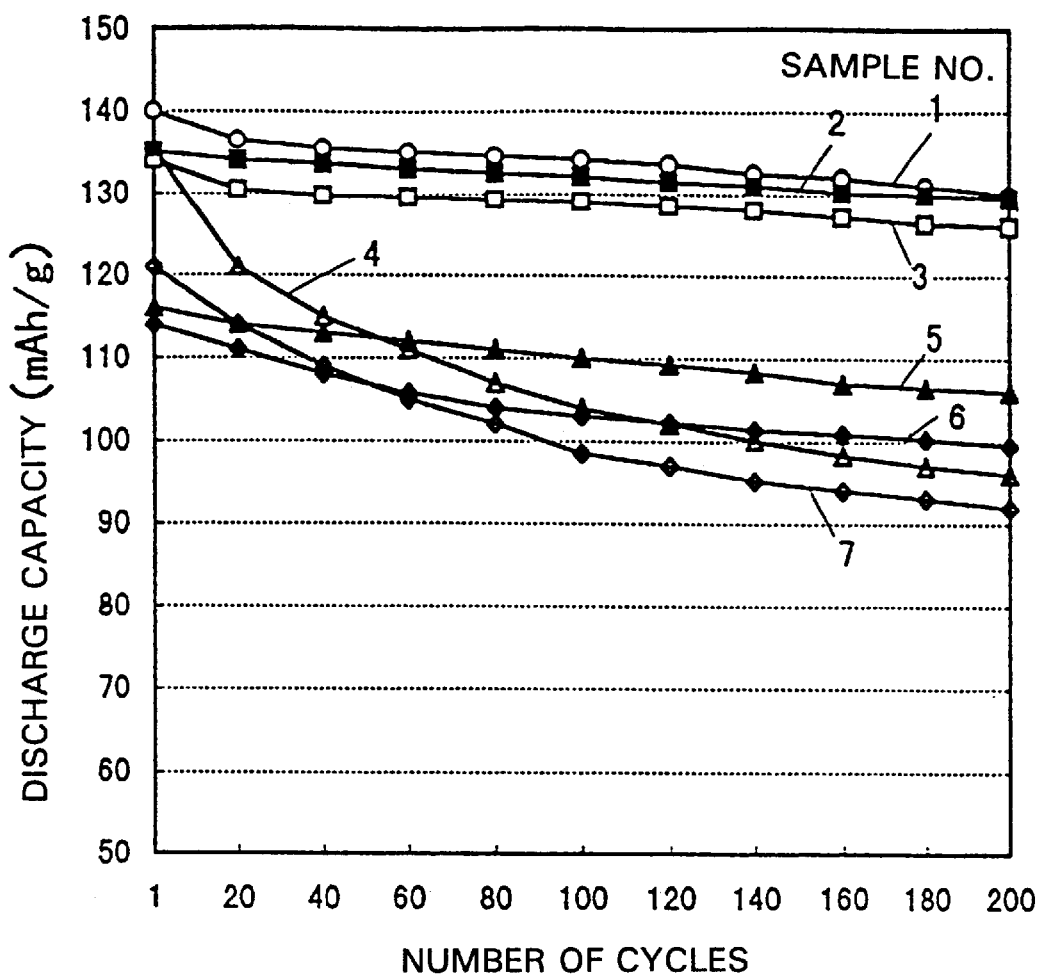
FIG. 3 is a graph showing the charge-discharge cycle characteristics of various lithium secondary batteries using cathode active materials comprising lithium cobalt complex oxide.

Next, the lithium secondary batteries thus obtained were subjected to a charge-discharge test of 200 cycles under the conditions such that the charge-discharge current density was 1.0 mA/cm$^2$, the max voltage was 4.2 V and the cut-off voltage was 3.0 V. The test results are shown in FIG. 3. In FIG. 3, the sample numbers of the secondary batteries are the same as those of the complex oxides used as the cathode active materials.

From the data in Table 1 and FIG. 3, it is recognized that the lithium secondary batteries of samples Nos. 1 to 3 comprising, as the cathode active material, a lithium cobalt complex oxide of LiCoO$_2$ which was in the form of spherical hollow secondary particles formed through sintering of primary particles to have a mean particle size of from about 1 to 5 micrometers (preferably about 2.8 to 4.3) and a specific surface area of from 2 to 10 m$^2$/g (preferably about 2.0 to 3.9) had high capacity and excellent charge-discharge cycle characteristics.

As opposed to these, the battery of sample No. 4 comprising particles of LiCoO$_2$ having a specific surface area of larger than 10 m$^2$/g, had bad charge-discharge cycle characteristics. This is because the contact area between the complex oxide particles and the non-aqueous electrolytic solution in this battery was too large, resulting in the non-aqueous electrolytic solution being decomposed too much. On the other hand, the battery of sample No. 5 comprising complex oxide particles having a specific surface area of smaller than 2 m$^2$/g, had low capacity. This is because the contact area between the complex oxide particles and the non-aqueous electrolytic solution in this battery was too small, resulting in that Li ions diffused insufficiently in the particles.

The battery of sample No. 6 in which the complex oxide, LiCoO$_2$, was bulky but not in the form of hollow spherical particles, had low capacity. This is because the particles constituting said bulky complex oxide had a large particle size and a small specific surface area and therefore the contact area between the complex oxide and the non-aqueous electrolytic solution could not be satisfactorily large, resulting in that Li ions diffused insufficiently in the cathode active material.

The cathode in sample No. 7 was produced by shaping a powder of the complex oxide of sample No. 6, and said powder was prepared by milling the complex oxide of sample No. 6. Sample No. 7 had low capacity and its charge-discharge characteristics were bad. This is because the non-electrolytic solution was greatly decomposed in the battery, and because the density of the active material of the complex oxide constituting the cathode was low due to its poor shapability.

Apart from the lithium cobalt complex oxide LiCoO$_2$ used in the above-mentioned Example, other lithium cobalt complex oxides prepared by substituting a part of the Co site of LiCoO$_2$ with any of Cr, Mn, Fe, Ni, Mg and Al also produce the same good results as in the above. All of these oxides may be designated LiCo$_{1-x}$A$_x$O$_2$ where A is the other metals and x is 0 to less than 1.

Apart from the spray-pyrolysis method employed in the above-mentioned Example to prepare the cathode active material of lithium cobalt complex oxide particles, other methods are also employable herein to prepare the complex oxide particles. For example, fine particles of the complex oxide obtained through wet synthesis may be grown to hollow, spherical secondary particles in a spray drier.

EXAMPLE 2

LiNiO$_2$ Used as the Lithium Cobalt Complex Oxide

Lithium nitrate and nickel nitrate were prepared as starting materials. The lithium nitrate and nickel nitrate were accurately weighed in a molar ratio, Li/Ni, of 1/1, and put into a container, to which was added 1000 ml of a mixture of water/alcohol, 1/1 by volume, and these were stirred to give a solution.

The resulting solution was atomized into a vertical thermal-decomposition furnace conditioned at a predetermined temperature falling between 600° C. and 800° C., at a rate of 1200 ml/hour through a nozzle, and pyrolyzed therein to obtain a powdery complex oxide. Next, the resulting complex oxide was put into an alumina sagger and annealed therein at a predetermined temperature falling between 300° C. and 900° C. for 2 hours. In that manner were obtained complex oxide samples Nos. 101 to 105 of LiNiO$_2$, as shown in Table 2. In Table 2, the samples marked with asterisk (*) are outside the scope of the present invention, while the others are within the scope of the invention.

Apart from these, a comparative sample, No. 106 in Table 2, of LiNiO$_2$ was obtained according to a conventional solid-phase reaction method. For this, prepared were starting materials of lithium carbonate and nickel oxide. Next, the lithium carbonate and nickel oxide were accurately weighed in a molar ratio, Li/Ni, of 1/1, then ground and mixed in a ball mill, and thereafter calcined at 800° C. for 48 hours to obtain a complex oxide.

In addition, another comparative sample, No. 107 in Table 2, was prepared. For this, low-melting-point lithium nitrate and nickel oxide were accurately weighed in a molar ratio, Li/Ni, of 1/1, then ground and mixed in a ball mill, and thereafter calcined in a liquid phase at 750° C. for 48 hours to obtain a complex oxide. This sample No. 107 of LiNiO$_2$ was again milled in a ball mill to obtain a comparative sample No. 108 shown in Table 2.

Pictures of the powdery complex oxides obtained hereinabove were taken through scanning electron microscope (SEM) photography, in which the morphology of the particles was observed and the particle size thereof was measured. In addition, the specific surface area of each complex oxide was obtained according to a nitrogen adsorption method. Further, the complex oxides were analyzed through X-ray diffractometry (XRD). The data obtained are shown in Table 2. In Table 2, LN indicates that the diffraction pattern of the sample corresponded to that of a layer-structured rock salt-type LiNiO$_2$ while giving no peaks for impurities.

Figure 4:
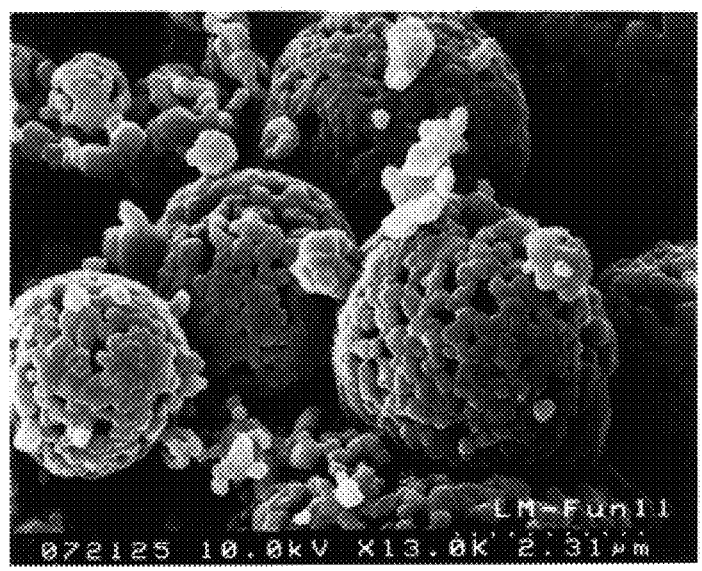
FIG. 4 is an SEM photograph of the cathode active material comprising lithium nickel complex oxide to be used in the lithium secondary battery of the present invention.

The SEM photograph of sample No. 101 in Table 2 is shown in FIG. 4. This shows that the complex oxide of sample No. 101 comprised hollow, spherical secondary particles formed through sintering of fine primary particles. The surface of each hollow, spherical secondary particle had many pores running into the inside thereof.

The powdery complex oxides obtained hereinabove were shaped into cathodes, whereupon their shapability was evaluated. Briefly, 100 parts by weight of complex oxide (the cathode active material), 5 parts by weight of acetylene black (a conductor), and from 5 to 20 parts by weight of polyethylene tetrafluoride (a binder) were kneaded and shaped into sheets. The shapability of the mixtures into sheets is shown in Table 2. In Table 2, "O" means that the mixture was well shaped into sheets; "P" means that the mixture was nearly shaped into sheets; and "X" means that the mixture could not be shaped into sheets.

TABLE 2

| Sample No. | Atomizing Temperature (° C.) | Annealing Temperature (° C.) | Shape of Particles | Mean particle Size (micrometer) | Specific Surface Area ($m^2/g$) | XRD Analysis | Shapability Amount of Binder Added (parts by weight) | | |
|---|---|---|---|---|---|---|---|---|---|
| | | | | | | | 5 | 10 | 20 |
| 101 | 800 | 800 | hollow spheres | 3.0 | 4.1 | LN | O | O | O |
| 102 | 800 | 600 | hollow spheres | 2.1 | 9.4 | LN | O | O | O |
| 103 | 600 | 800 | hollow spheres | 4.6 | 2.1 | LN | O | O | O |
| *104 | 800 | 300 | hollow spheres | 1.1 | 27.3 | LN | P | O | O |
| *105 | 800 | 900 | hollow spheres | 7.6 | 0.5 | LN | O | O | O |
| *106 | 800 (solid phase reaction method) | | bulky mass | 8.3 | 0.4 | LN | O | O | O |
| *107 | 750 (liquid phase reaction method) | | bulky mass | 9.2 | 0.3 | LN | O | O | O |
| *108 | 750 (liquid phase reaction method) | | bulky mass | 1.0 | 7.8 | LN | X | P | O |

Next, using the complex oxides obtained hereinabove as the cathode active material, produced were secondary batteries.

Precisely, 100 parts by weight of the complex oxide, 5 parts by weight of acetylene black (a conductor), and 5 parts by weight of polyethylene tetrafluoride (a binder) were kneaded and shaped into sheets. For sample No. 107, 10 parts by weight of the binder was used since its shapability was poor, as noted in Table 2. Each sheet was attached under pressure to a 17 mm-diameter disc of SUS mesh to prepare a cathode.

Next, as shown in FIG. 2 (the same FIG. 2 and reference numerals therein mentioned in Example 1 are used here again), the cathode 3 was combined with an anode 4 of lithium metal (diameter: 17 mm, thickness: 0.2 mm) with a polypropylene separator 5 therebetween, with the SUS mesh of the cathode 3 facing outward, and cased in a cathode can 1 made of stainless steel with the cathode 3 facing downward. Then, an electrolytic solution was impregnated into the separator 5. As the electrolytic solution, used herein was a solution as prepared by dissolving $LiPF_6$ in a 1/1 (by volume) mixed solvent of propylene carbonate and 1,1-dimethoxyethane, to a concentration of 1 mol/liter. Next, the opening of the cathode can 1 was sealed with an anode plate 2 made of stainless steel with an insulating packing 6 therebetween. Thus was obtained a lithium secondary battery.

Figure 5:
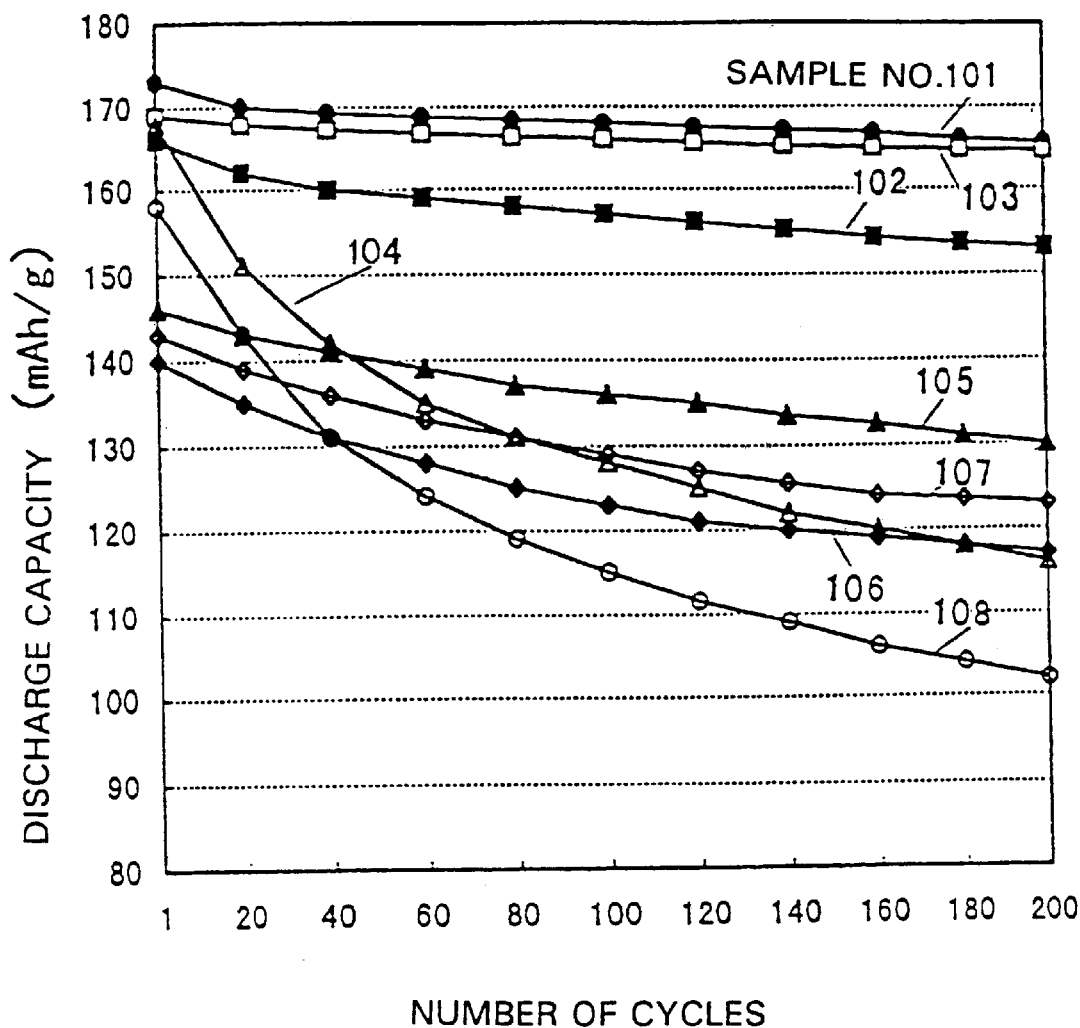
FIG. 5 is a graph showing the charge-discharge cycle characteristics of various lithium secondary batteries using cathode active materials comprising lithium nickel complex oxide.

Next, the lithium secondary batteries thus obtained were subjected to a charge-discharge test of 200 cycles under the conditions such that the charge-discharge current density was 1.0 mA/$cm^2$, the max voltage was 4.2 V and the cut-off voltage was 3.0 V. The test results are shown in FIG. 5. In FIG. 5, the sample numbers of the secondary batteries are the same as those of the complex oxides used as the cathode active materials.

From the data in Table 2 and FIG. 5, it is known that the lithium secondary batteries of samples Nos. 101 to 103 comprising, as the cathode active material, a lithium nickel complex oxide of $LiNiO_2$ which was in the form of spherical hollow secondary particles formed through sintering of primary particles to have a mean particle size of from about 1 to 5 micrometers (preferably about 3.0 to 4.6) and a specific surface area of from 2 to 10 $m^2/g$ (preferably about 2.1 to 4.1), had high capacity and excellent charge-discharge cycle characteristics.

As opposed to these, the battery of sample No. 104 comprising particles of $LiNiO_2$ having a specific surface area of larger than 10 $m^2/g$, had bad charge-discharge cycle characteristics. This is because the contact area between the complex oxide particles and the non-aqueous electrolytic solution in this battery was too large, resulting in the non-aqueous electrolytic solution being decomposed too much. On the other hand, for the battery of sample No. 105 comprising complex oxide particles having a specific surface area of smaller than 2 $m^2/g$, had low capacity. This is because the contact area between the complex oxide particles and the non-aqueous electrolytic solution in this battery was too small, resulting in that Li ions diffused insufficiently in the particles.

The batteries of samples Nos. 106 and 107 in which the complex oxide, $LiNiO_2$, was bulky but not in the form of hollow spherical particles, had low capacity. This is because the particles constituting said bulky complex oxide had a large particle size and a small specific surface area and therefore the contact area between the complex oxide and the non-aqueous electrolytic solution could not be satisfactorily large, resulting in that Li ions diffused insufficiently in the cathode active material.

The cathode in sample No. 108 was produced by shaping a powder of the complex oxide of sample No. 107, and said powder was prepared by milling the complex oxide of sample No. 107. Sample No. 108 had low capacity and its charge-discharge characteristics were bad. This is because the non-electrolytic solution was greatly decomposed in the battery, and because the density of the active material of the complex oxide constituting the cathode was low due to its poor shapability.

Apart from the lithium nickel complex oxide, $LiNiO_2$, used in the above-mentioned Example, other lithium nickel complex oxides prepared by substituting a part of the Ni site of $LiNiO_2$ with any of Cr, Mn, Fe, Co, Mg and Al also produce the same good results as in the above. Such oxides can be designated $LiNi_{1-x}A_xO_2$ where A is the other metal and x is 0 to less than 1.

Apart from the spray-pyrolysis method employed in the above-mentioned Example to prepare the cathode active material of lithium nickel complex oxide particles, other methods are also employable herein to prepare the complex oxide particles. For example, fine particles of the complex oxide obtained through wet synthesis may be grown to hollow, spherical secondary particles in a spray drier.

As has been described in detail hereinabove, the lithium secondary battery of the present invention comprises, as the cathode active material, a lithium cobalt complex oxide such as $LiCoO_2$ or a lithium nickel complex oxide such as $LiNiO_2$, which is in the form of hollow, spherical secondary particles formed through sintering of primary particles to have a mean particle size of from 1 to 5 micrometers and a specific surface area of from 2 to 10 m²/g. Accordingly, the lithium secondary battery of the invention has high capacity and excellent charge-discharge cycle characteristics.

What is claimed is:

1. A lithium secondary battery comprising a cathode having a lithium-(cobalt/nickel) complex oxide as a cathode active material, characterized in that said lithium (cobalt/nickel) complex oxide is in the form of hollow, spherical particle sinters of smaller primary particles, and said sinters are produced at a temperature of 600° C. or more and have a mean particle diameter of from about 1 to 5 micrometers and a specific surface area of from about 2 to 10 m²/g.

2. The lithium secondary battery according to claim 2, characterized in that the complex oxide is $LiCo_{1-x}A_xO_2$ which A is at least one member selected from the group consisting of Cr, Mn, Fe, Ni, Mg and Al, and x ru is 0 to less than 1.

3. The lithium secondary battery according to claim 2, characterized in that said lithium complex oxide is $LiCoO_2$.

4. The lithium secondary battery according to claim 3, characterized in that said sinters have a mean particle diameter of from about 2.8 to 4.3 micrometers and a specific surface area of from about 2.0 to 3.9 m²/g.

5. The lithium secondary battery according to claim 2, characterized in that said sinters have a mean particle diameter of from about 2.8 to 4.3 micrometers and a specific surface area of from about 2.0 to 3.9 m²/g.

6. The lithium secondary battery according to claim 1, characterized in that said sinters have a mean particle diameter of from about 2.8 to 4.3 micrometers and a specific surface area of from about 2.0 to 3.9 m²/g.

7. The lithium secondary battery according to claim 1, characterized in that said complex oxide is $LiNi_{1-4}A_xO_2$ in which A is at least one member selected from the group consisting of Cr, Mn, Fe, Co, Mg and Al, and x is 0 to less than 1.

8. The lithium secondary battery according to claim 7, characterized in that said lithium complex oxide is $LiNiO_2$.

9. The lithium secondary battery according to claim 8, characterized in that said sinters have a mean particle diameter of from about 3.0 to 4.6 micrometers and a specific surface area of from about 2.1 to 4.1 m²/g.

10. The lithium secondary battery according to claim 7, characterized in that said sinters have a mean particle diameter of from about 3.0 to 4.6 micrometers and a specific surface area of from about 2.1 to 4.1 m²/g.

11. The lithium secondary battery according to claim 1, characterized in that said sinters have a mean particle diameter of from about 3.0 to 4.6 micrometers and a specific surface area of from about 2.1 to 4.1 m²/g.

12. The lithium secondary battery according to claim 1, wherein the smaller primary particles were produced by atomizing and pyrolyzing a solution containing lithium and one of cobalt and nickel in furnace.

13. The lithium secondary battery according to claim 12, characterized in that the complex oxide is $LiCo_{1-x}A_xO_2$ in which A is at least one member selected from the group consisting of Cr, Mn, Fe, Ni, Mg and Al, and x is 0 to less than 1.

* * * * *